Patented Feb. 23, 1954

2,670,332

UNITED STATES PATENT OFFICE 2,670,332

OIL-IN-WATER COAL TAR EMULSION AND PROCESS OF MAKING IT

Paul E. McCoy, Oakland, and Carl E. Neill, El Cerrito, Calif., assignors, by mesne assignments, to American Bitumuls & Asphalt Company, San Francisco, Calif., a corporation of Delaware No Drawing. Application August 21, 1951, Serial No. 242,988

11 Claims. (Cl. 252—311.5)

The present invention relates to aqueous dispersions of coal tar, and to the process of preparing the same. More particularly, the invention has to do with the preparation of an oil-in-water type emulsion of coal tar of improved electrolytic and storage stability. Moreover, our emulsions are characterized by finer particle size of the dispersed tar, and are compatible with fillers and rubber latices, natural or synthetic.

Our emulsions are of particular utility in protecting asphalt pavements of airports, a problem that has become acute since the advent of the jet plane. Fuel spillage surrounding the loading and take-off of jet planes seriously impairs the cohesiveness of the structure of asphalt runways, tax areas and loading zones. The fuel used, being of the nature of kerosene or crude gasoline, readily softens and dissolves asphalt causing disintegration of the paving mixture. Coal tars and coal tar pitches have been found to be more resistant to the solvent action of jet fuel than asphalts. Since, however, tars are of a readily oxidizable nature and are easily damaged by overheating upon application, it is desirable to handle them without heating, that is, in emulsion form.

The only fairly satisfactory coal tar emulsions now on the market are made with the aid of clay. However, these presently marketed emulsions have certain disadvantages which are common to clay emulsions. For example, they cannot be sprayed by commonly available equipment, such as distributor trucks, ordinary paint spray equipment, and the like because of the thick consistency of the emulsion due to the clay and the coarseness of the dispersed tar. Dilution of presently available coal tar emulsions has been proposed, but this is not feasible because, owing to the coarseness of the dispersed tar, rapid settlement and coalescence of the tar occur. Moreover the coal tar emulsions heretofore prepared are not compatible with rubber latices, and cause breakdown of such latices when mixed therewith.

We are aware of the fact that a number of prior art processes exist for the emulsification of bituminous materials, particularly asphalt, involving, for example, alkaline emulsifying agents and soaps. These prior art practices, however, do not yield an emulsion of coal tar having the required stability, unreactivity and particle characteristics of the dispersed phase required for the purposes described herein.

Accordingly, an object of the invention is to provide a process for the preparation of a coal tar oil-in-water type emulsion of improved stability and non-reactivity.

Another object of the invention is to prepare coal tar emulsions of the oil-in-water type wherein the dispersed coal tar is of fine particle size.

Still another object of the invention is to prepare an oil-in-water coal tar emulsion capable of being mixed with normally emulsion-breaking materials, such as mineral fillers, gums, and the like.

Yet another object of the invention is to prepare coal tar emulsions which will not cause breakdown of rubber latices when mixed therewith.

Other objects and advantages of the invention will be apparent from the ensuing description of the invention.

The invention contemplates coal tar emulsions prepared under controlled conditions with a lignin type emulsifying agent. More specifically, the invention is carried out by the dispersion of coal tar, to form an emulsion of the oil-in-water type, in a solution of a lignin type emusifying agent, preferably a purified lignin, the said solution containing, in addition, a thickening agent, for example, an alkali metal salt of carboxymethyl cellulose, which said thickening agent serves, in the dispersing operation, as a shearing medium to permit comminution and reduce to fine particle size the coal tar. Moreover, emulsification is effected under the controlled conditions, such as temperature and pH, hereinafter described. The resulting emulsion is characterized by good stability, unreactivity and a dispersed coal tar of fine particle size.

In carrying out the invention, coal tar heated to maintain fluidity, and preferably at a temperature not greatly exceeding that required for fluidity, is dispersed to form an oil-in-water type emulsion in an aqueous solution or mixture containing about 0.4 to 4.0%, preferably 1 to 3%, thickening agent, for example, the sodium salt of carboxymethyl cellulose, about 2 to 20%, preferably about 10–15%, lignin emulsifying agent, the said solution containing, if needed, just sufficient caustic to solubilize the lignin. Sufficient additional water is then added so as to give in the final emulsion an amount of the dispersed coal tar, based on residue, of 15 to 80, preferably 60, as determined by A. S. T. M. D:244-49. The pH of the finished emulsion is below 10, preferably below 9, down to as low as about 7.5.

By way of illustration, a suitable emulsion was prepared as follows, the parts being by weight: In 19.6 parts water is dispersed about 0.4 part of the alkali metal salt of carboxymethyl cellulose and about 3 parts lignin, for example, the purified lignin of Paul E. McCoy U. S. Patent No. 2,481,322. The resulting mixture is mixed with a solution of about 1.08 parts water and about 0.12 part caustic to give a paste. To this paste, preferably at a temperature of 80°–120° F., there is added while effecting emulsification by any well known process, such as in a pot provided with mixing means, about 50 parts coal tar, for example an RT-11 or RT-12 coal tar, maintained at a temperature between about 190° F. and 210° F. After emulsification, diluting water, at a temperature of about 100–120° F., is added, while mixing, in an amount of about 25.8 parts to effect a total of 100 parts. If desired, the emulsions contemplated by the invention may be prepared by means of a colloid mill. In this event, molten tar is fed thereinto simultaneously with an aqueous stream of the other ingredients in suitable proportions.

As hereinbefore indicated the quantities in the finished emulsion of the ingredients listed above can vary. Thus, the amount of alkali metal salt of carboxymethyl cellulose can vary from about 0.1 part to about 1.0 part, the preferred amount being 0.4 part; the caustic in sufficient amount to effect in the final emulsion a pH below 10, preferably below 9, to as low as about 7.5; the lignin emulsifying agent from about 1 part to 10 parts, preferably 3 parts; the amount of coal tar from about 10 parts to 80 parts, preferably 50 parts; water, in a sufficient amount to make 100 parts, the parts being by weight.

The preferred thickening agent is an alkali metal salt of carboxymethyl cellulose, for example the sodium salt of carboxymethyl cellulose produced by the reaction of monochloro acetic or glycolic acids on alkali cellulose, or by any other suitable method. It is available in commerce in three types; low viscosity (25 to 50 centipoises), medium viscosity (400 to 600 centipoises), and high viscosity (approximately 2000 centipoises). Although the three types are operative, the preferred type is one of medium viscosity, that is one having a viscosity of about 600 centipoises. Less desirably, other cellulose materials such as methyl cellulose and hydroxy ethyl cellulose can be used. Certain other thickening agents can be used but are not regarded as the equivalent of an alkali metal salt of carboxymethyl cellulose. Examples of these are locust bean gum, algin, casein, pectins and tannins.

The lignin emulsifying agent can be derived from soda process liquor, waste sulfite or waste sulfate liquors obtained from the pulping of wood, the amount to be used being based on the solids content of such liquors. However, we have found that far superior results are obtained if the lignin material is of the refined or purified type, for example, as described in Paul E. McCoy U. S. Patent No. 2,481,332 and/or in Walter D. Buckley and Paul E. McCoy U. S. Patent No. 2,483,806. To the extent pertinent therefore these patents are hereby incorporated by reference. The use of these pure lignins results in compositions, which, upon use, are waterproof and non re-emulsifiable. Compositions containing the unrefined lignin are adversely affected by water and tend to re-emulsify when used.

The coal tar material employed in accordance with the invention is one suitable for road paving, such as gas-works, coke-oven and/or water gas tars. A suitable description of these tars appears in American Association of State Highway Officials Designation: M52-42 and set forth in the specification for 1950, sixth edition, part I, at pages 20–21. The preferred tars are the RT-9 to RT-12 coke oven coal tars. Less desirably employed are the corresponding coal tar pitches.

The emulsion prepared as above described is now capable of tolerating the presence of additional ingredients to render it suitable as an oil or solvent and heat resistant surfacing or resurfacing material for roads, pavements, airports, and the like. For example, the emulsion may be formed into a thick, plastic trowellable composition by the addition of gums, natural or synthetic rubber, mineral fillers and fibers, pigments and the like.

Thus, to the emulsion there may be added a fortifying synthetic rubber latex in an amount by weight of the emulsion of about 5 to about 50, preferably 10–20, of a butadiene-acrylonitrile copolymer. While this copolymer is preferred, other synthetic rubber latices are operative. Among these may be mentioned butadiene-styrene, vinyl chloride-vinylidene chloride copolymers; Thiokol, an ethylene dichloride-alkali polysulfide condensation product; and neoprene, polymer of a chlorobutadiene. Natural rubber latex is also suitable.

In order to preserve the consistency of the composition when dry regardless of weather conditions or temperatures, there is advantageously incorporated in the emulsion, in addition to the rubber latex above mentioned, a mineral filler such as slate dust. While other stone dusts or argillaceous materials, such as talc, mica, bentonite clay, and the like can be used, slate dust is preferred. The amount of mineral filler employed can range from about 10 to about 50, preferably 25 to 35% by weight of the emulsion.

In order to improve the trowelling characteristics of the paving composition, there is incorporated therein a suitable amount of a fire-resistant mineral fibrous material, such as asbestos fibres, available commercially in either long or short form; glass fibres; rock wool fibres, and the like. Asbestos is preferred. The amount of the fibrous material can vary from about 10% to about 50, preferably 25 to 35% by weight of the emulsion.

As thus far described, then, a suitable composition can be made up of the following ingredients within about the indicated proportion, parts being by weight:

| Ingredients | Parts |
| --- | --- |
| Coal Tar Emulsion | 25–50 |
| Mineral Filler | 5–20 |
| Mineral Fibre | 5–15 |
| Rubber Latex | 2–10 |
| Water | 03–5 |

In addition to the ingredients enumerated above, we have found the composition to be improved by the incorporation therein of a reinforcing pigment, such as carbon black. The presence of this material protects the coal tar against the deteriorating action of ultra-violet light and generally improves the weathering characteristics of the composition. Other reinforcing pigments are lamp blacks, iron oxide, chrome oxide and other inorganic pigments generally useful in the paint art. The amount of the pigment can vary from about 1 to about 25%, preferably 2 to 5% by weight of the emulsion.

In preparing the composition containing the ingredients thus far listed, we have found that best results are achieved by following a certain sequence of mixing steps. That is, first, the mineral filler, such as slate dust; mineral fiber, such as asbestos; and reinforcing pigment, such as carbon black, are all combined with sufficient water to form a paste. Next, the paste of these ingredients is mixed with the coal tar emulsion, followed by the addition to the resulting mixture of the synthetic rubber latex.

Finally there may be added finely ground sand, of a size such that substantially all of the particles pass through a 20 mesh sieve and substantially all are retained on a 200 mesh sieve. The sand is preferably added as the last ingredient, and is incorporated into the composition with a minimum of agitation, but sufficient to effect admixture of the sand with the ingredients of the composition.

Superior paving mixtures comprise the following ingredients within the indicated range of proportions, parts being by weight.

| Ingredients | Parts |
| --- | --- |
| Coal Tar Emulsion | 20-40 |
| Mineral Filler | 5-15 |
| Mineral Fibers | 5-15 |
| Rubber Latex | 2-10 |
| Pigment | 0.5-10 |
| Sand | 10-20 |
| Water | 20-50 |

Obviously many modifications and variations of the invention hereinbefore set forth may be made without departing from the spirit and scope thereof, and, therefore, only such limitations should be imposed as are indicated in the appended claims.

We claim:

1. An oil-in-water type coal tar emulsion of high electrolytic and storage stability and compatible with fortifying synthetic rubber, comprising by weight 10 to 80 parts coal tar, 1 to 10 parts lignin emulsifying agent, 0.1 to 1 part thickening agent, caustic in sufficient amount to give a pH of at least 7.5 but less than 10, and sufficient water to make a total of 100 parts.

2. An oil-in-water type emulsion of high electrolytic and storage stability and compatible with fortifying synthetic rubber comprising by weight 10 to 80 parts of at least one bitumen selected from the group consisting of coal tar and coal tar pitch, 1 to 10 parts lignin emulsifying agent, 0.1 to 1 part thickening agent, caustic in sufficient amount to give a pH of at least 7.5 but less than 10, and sufficient water to make a total of 100 parts.

3. Composition substantially as described in claim 2, wherein the bitumen is an RT-9 to RT-12 coke oven coal tar.

4. Composition substantially as described in claim 2, wherein the lignin emulsifying agent is purified lignin.

5. Composition substantially as described in claim 2, wherein the thickening agent is an alkali metal salt of carboxymethyl cellulose.

6. Composition substantially as described in claim 5, wherein the thickening agent is sodium salt of carboxymethyl cellulose having a viscosity of about 600 centipoises.

7. An oil-in-water type coal tar emulsion of high electrolytic and storage stability and compatible with fortifying synthetic rubber, comprising a fine dispersion of coal tar in an aqueous mixture of 10-15% lignin emulsifying agent and 1 to 3% thickening agent, together with sufficient caustic and water to give 100 parts by weight of an emulsion having a pH of at least 7.5 but below 10 and comprising 10 to 80 parts coal tar, 1 to 3 parts lignin emulsifying agent and 0.1 to 1 part thickening agent.

8. Composition substantially as described in claim 1, wherein the thickening agent is sodium salt of carboxymethyl cellulose having a viscosity of about 600 centipoises.

9. Process of preparing an oil-in-water type emulsion, which comprises forming an aqueous paste of alkali metal salt of sodium carboxymethyl cellulose thickening agent and lignin emulsifying agent, dispersing into said paste a molten bitumen selected from the group consisting of coal tar and coal tar pitch to form a dispersion of the oil-in-water type, diluting said dispersion with water to yield a finished emulsion comprising, by weight, 10 to 80 parts of said bitumen, 0.1 to 1 part of said thickening agent, 1 to 10 parts of said emulsifying agent, and water in sufficient amount to make 100 parts, said finished emulsion containing sufficient caustic to give a pH of at least 7.5 but below 10.

10. Process substantially as described in claim 9, wherein the lignin emulsifying agent is a purified lignin.

11. Process substantially as described in claim 10, wherein the bitumen is an RT-9 to RT-12 coal tar.

PAUL E. McCOY.
CARL E. NEILL.

References Cited in the file of this patent

UNITED STATES PATENTS

| Number | Name | Date |
| --- | --- | --- |
| 1,758,914 | Sadtler | May 13, 1930 |
| 2,374,766 | Mayfield | May 1, 1945 |
| 2,431,891 | Rosencranse | Dec. 21, 1947 |
| 2,446,903 | Bright | Aug. 10, 1948 |
| 2,483,806 | Buckley et al. | Oct. 4, 1949 |
| 2,550,211 | Watters | Apr. 24, 1951 |
| 2,578,888 | Kaveler | Dec. 18, 1951 |

OTHER REFERENCES

Ind. & Eng. Chem., vol. 37, Oct. 1945, pages 943-947.